Aug. 18, 1942.　　　A. W. MORRIS ET AL　　　2,293,400
METHOD FOR PRODUCING METAL BODIES
Filed Jan. 21, 1941.　　　4 Sheets-Sheet 1
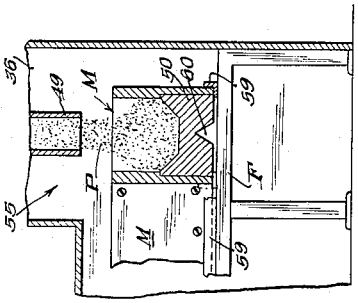
FIG. 3.
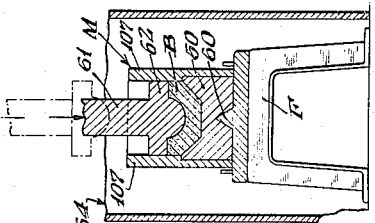
FIG. 4.
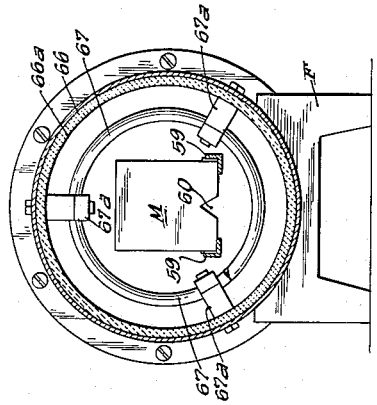
FIG. 2.
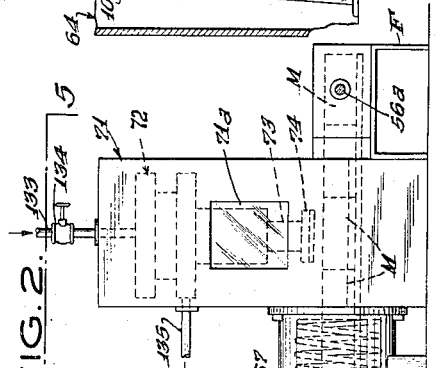
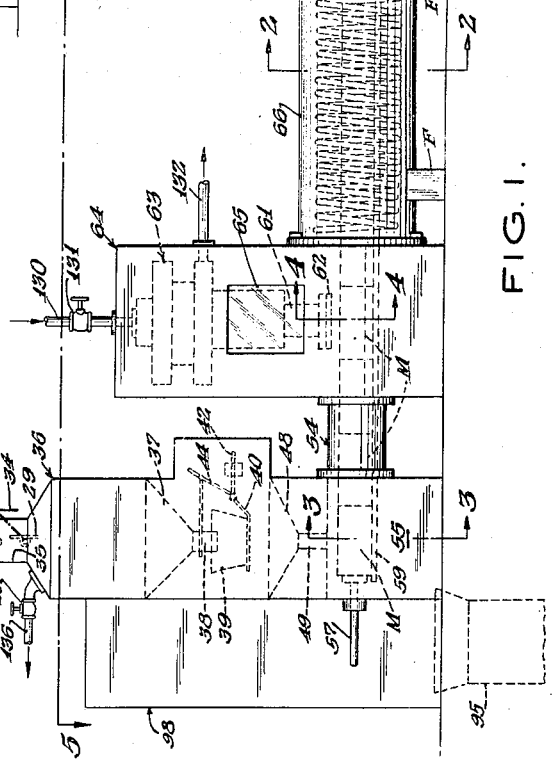
FIG. 1.
INVENTORS
Albert W. Morris
William J. Sinnott
BY
Mock & Blum
ATTORNEYS

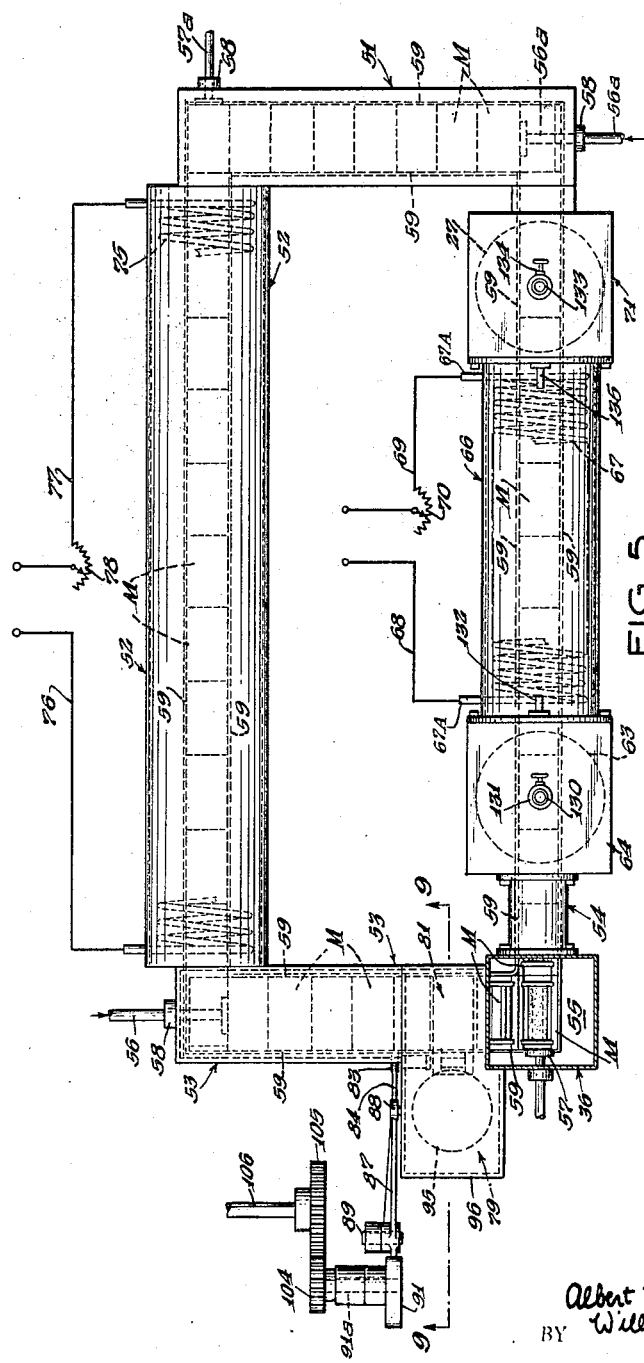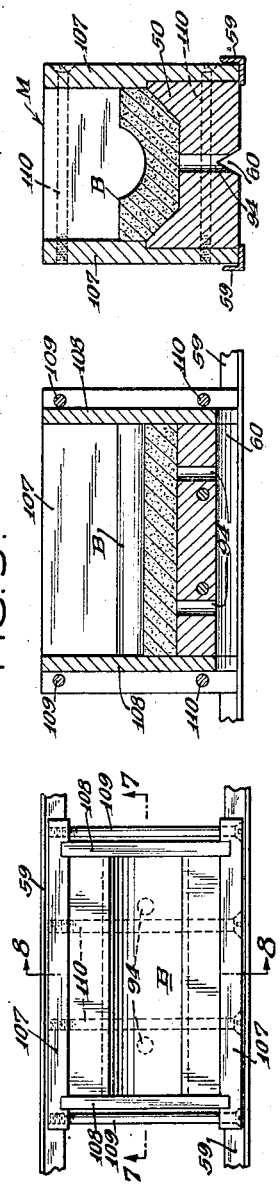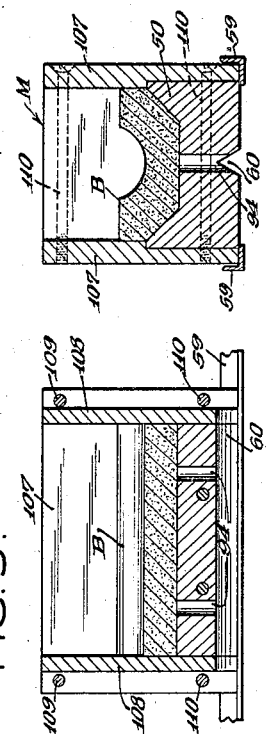

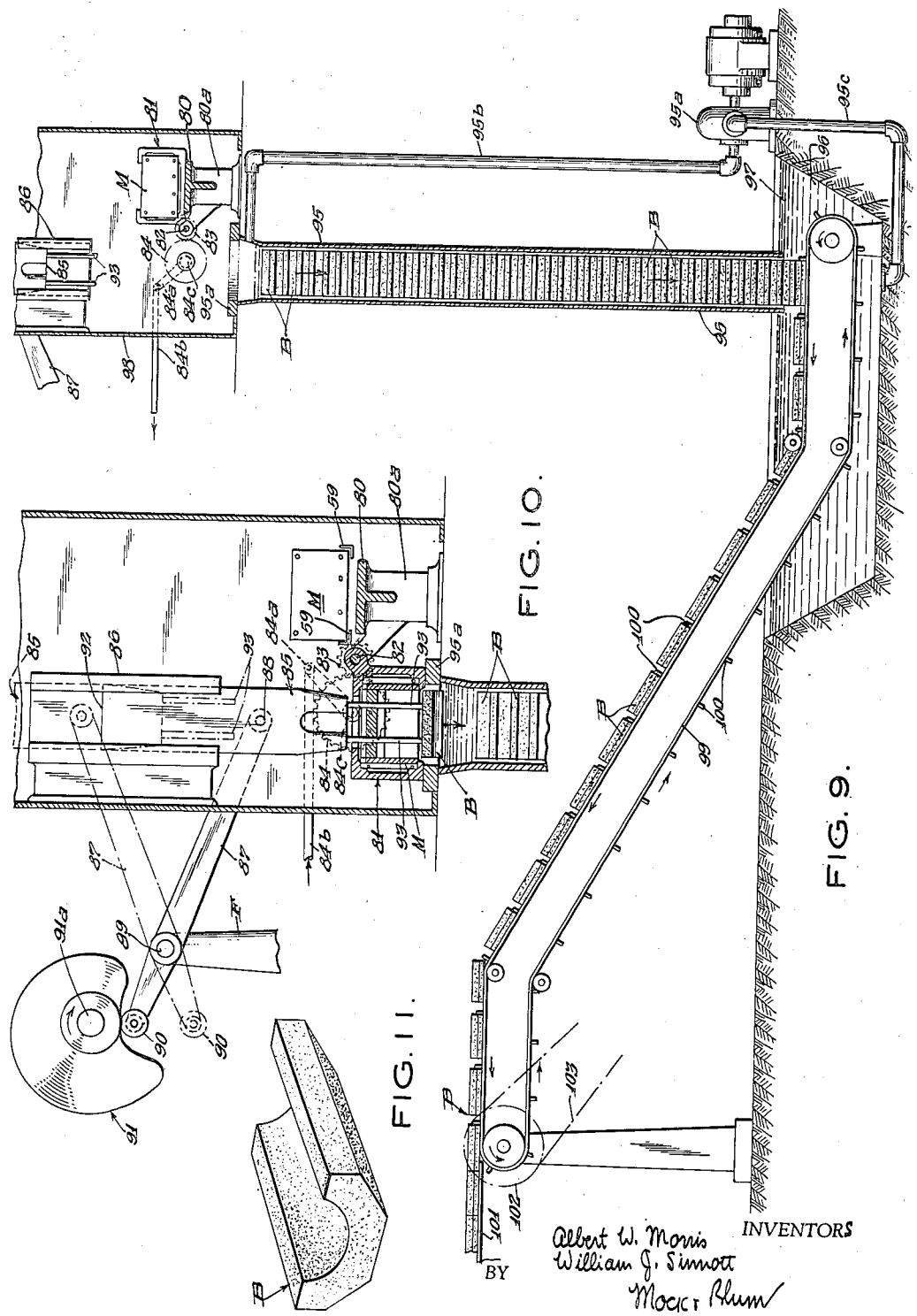

Aug. 18, 1942.　　A. W. MORRIS ET AL　　2,293,400
METHOD FOR PRODUCING METAL BODIES
Filed Jan. 21, 1941　　4 Sheets-Sheet 4
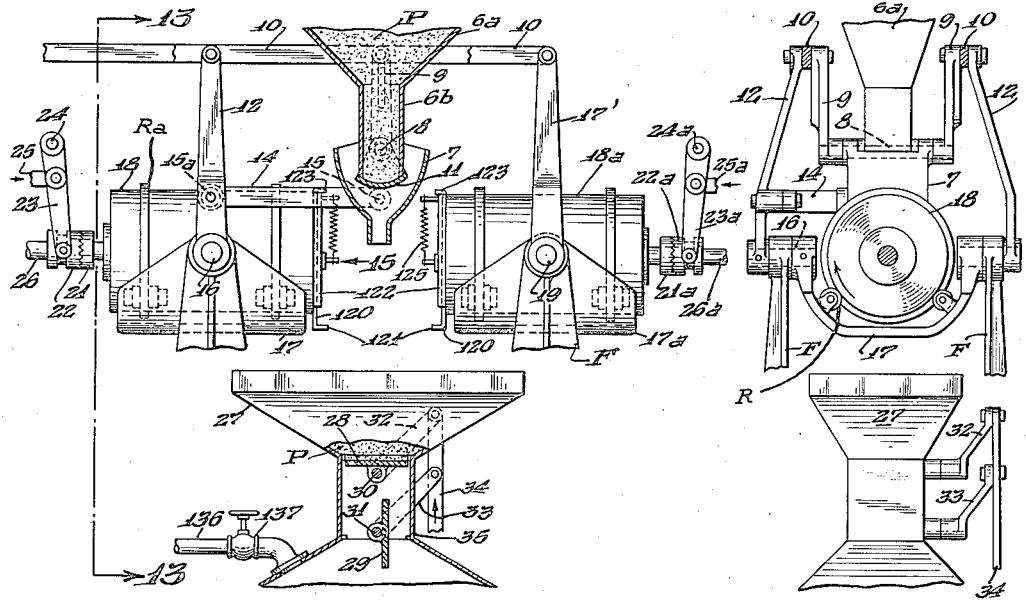
FIG.12.　　FIG.13.
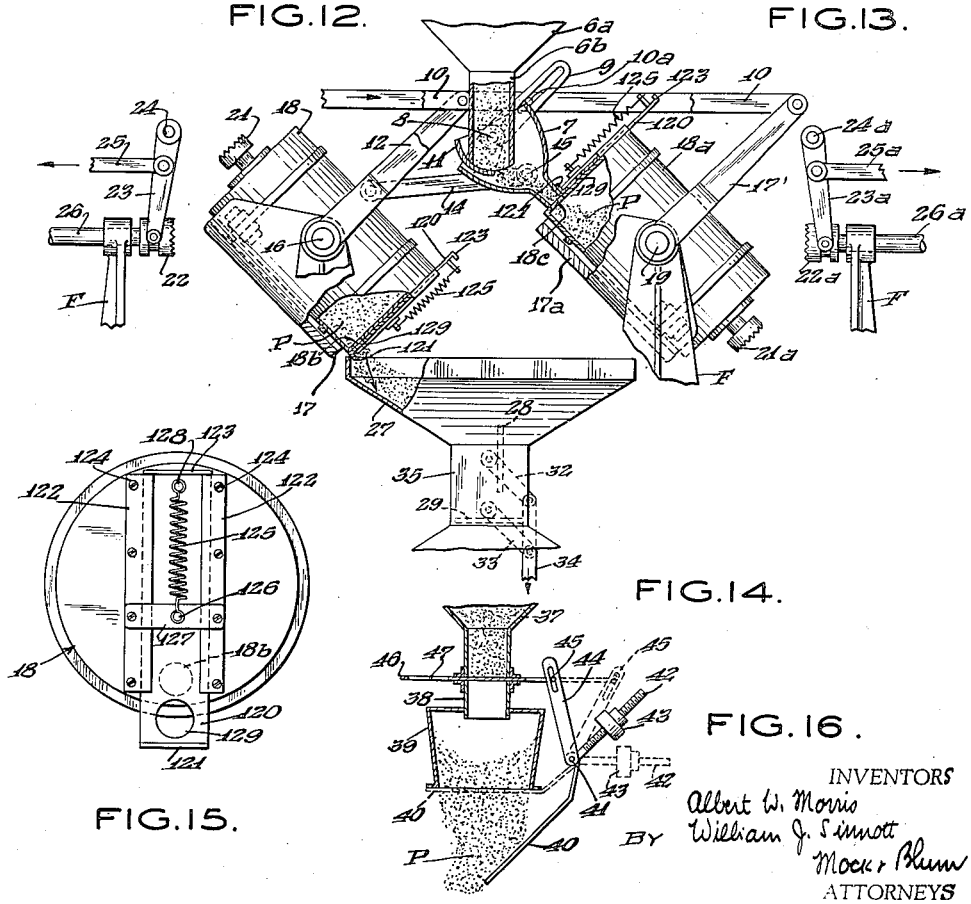
FIG.14.
FIG.15.　　FIG.16.
INVENTORS
Albert W. Morris
William J. Sinnott
BY
Mock & Blum
ATTORNEYS Patented Aug. 18, 1942

2,293,400

UNITED STATES PATENT OFFICE 2,293,400

METHOD FOR PRODUCING METAL BODIES

Albert W. Morris, Springfield, and William J. Sinnott, Ipswich, Mass., assignors to Isthmian Metals, Inc., Boston, Mass., a corporation of Massachusetts Application January 21, 1941, Serial No. 375,108

13 Claims. (Cl. 75—22)

This invention relates to a new and improved method for producing metal bodies, and more particularly, metal bodies of porous structure.

The invention relates to the production of metal bearings or bushings of porous structure, which can take up oil or other suitable lubricant or through which a suitable lubricant can be forced. The invention also relates to producing parts of bearings or bushings, which can be assembled in order to make the complete bearings and bushings. However, the invention is not limited to any specific device or apparatus.

For example, the invention includes the manufacture of dense metal bodies, such as projectiles, pipe fittings, gun parts, and other articles, which can be made of any desired density and coherence by proper proportioning of the ingredients of the materials, and proper regulation of pressure and temperature conditions. Such dense bodies may have substantially the same internal structure as castings, forgings, stampings, etc.

Another object of the invention is to provide an improved method for producing metal bodies which are made of particles which are connected to each other by means of a sintering or welding operation.

Another object of the invention is to protect the metal particles against oxidation, during the process of manufacture.

Other objects of the invention will be set forth in the following description and diagrammatic drawings which illustrate a preferred embodiment thereof, it being understood that the above general statement of the objects of the invention is intended generally to explain the same, but without limiting the invention in any manner.

The drawings are not made according to scale.

Fig. 1 is a side elevation of the apparatus which is used for carrying out the improved method. In this position, the tumbling barrel 18 is receiving a charge of material, and the other tumbling barrel is discharging material.

Figs. 2–5 are respectively sectional views on the lines 2—2, 3—3, 4—4 and 5—5 of Fig. 1.

Fig. 6 is a top plan view of the mold in which the metal body is cold-pressed and then hot-pressed and from which the completed metal body is ejected.

Figs. 7 and 8 are respectively sectional views on the lines 7—7 and 8—8 of Fig. 6.

Fig. 9 is a sectional view on the line 9—9 of Fig. 5.

Fig. 10 is an enlarged view of the outlet end of the apparatus, showing a mold in the position in which the completed metal article is ejected from said mold.

Fig. 11 is a perspective view of an article which is made according to our invention. This illustrates a car journal bearing. The article may be of any size or shape, and it may be made of any material, metallic or non-metallic, or of any combination of materials.

Fig. 12 is a side elevation, partially in section, of the upper part of the apparatus. This shows the tumbling barrels in their respective intermediate positions, in which their shafts are turned. In said positions, neither barrel receives or discharges material.

Fig. 13 is a view on the line 13—13 of Fig. 12.

Fig. 14 is similar to Fig. 12, showing the barrel 18 in its discharge position, and barrel 18a in its receiving position.

Fig. 15 is an elevation of the end-wall of each barrel, in which the filling opening is located.

Fig. 16 is a detail view of the scale mechanism.

The material which is to be treated according to the specific embodiment of the invention, consists of particles of pure iron, although the invention is not limited to the use of any particular metal or alloy. The size of the metal particles may vary between the size of the particles which can pass through a No. 20 mesh wire screen and a No. 300 mesh wire screen. This corresponds to a particle size of about 840 microns to about 49 microns. The particles which are used in making a body may vary in size between said limits, instead of being of uniform size. The iron is preferably as pure as possible, and said particles are free from oil, dirt and the like. This material is transported to the apparatus by means of a belt conveyor whose upper run 1 has the trough shape which is shown in Fig. 1. The upper run 1 of the belt is supported upon inclined rolls 2 and horizontal rolls 3. The lower run of said belt conveyor is supported upon the horizontal rolls 4. The rolls 1, 2 and 4 have their bearings located in a suitable frame 5. The conveyor 1 may deliver a plurality of metallic or non-metallic ingredients, which are intermixed in barrels 18 and 18a. These barrels may also be used in mixing aggregates or ingredients of different sizes.

This frame 5 is fixed to the main frame F of the machine. Only a part of this main frame F is shown in the drawings. The conveyor 1 delivers the powdered material P, either continuously or intermittently, to the upper open end of a hopper 6, which has a reduced lower portion 6a. The material which is thus delivered to the hopper 6 may consist of a mixture of ingredients, if it is desired to form the metal article from such mixture, or an alloy thereof. At its lower end, the hopper 6 is provided with an outlet nozzle 6b. The hopper 6 is suitably fixed to the frame F of the machine.

A shaft 8 extends through the wall of the outlet nozzle 6b. Arms 9, which are external to the outlet nozzle 6b, are fixed to the shaft 8, and a valve 11, which controls the flow of material through the outlet nozzle 6b, is also fixed by suitable arms to the shaft 8. The shaft 8 and the arms 9 and the valve 11, therefore turn in unison. In its upper end, each arm 9 is provided with a longitudinal slot. Horizontal bars 10 are horizontally reciprocated, equally and in unison, by any suitable mechanism. Each bar 10 has a pin 10a which is located in the longitudinal slot of the respective rod 9.

Tumbling or mixing barrels 18 and 18a, which are identical in construction, are respectively rigidly fixed to identical yokes 17 and 17a. For this purpose, each barrel 18 and 18a is provided with external ribs Ra, which are clamped between clamping members R of the respective yokes. The yoke 17 is provided with pivot pins 16 which are fixed to said yoke 17. Said pivot pins turn in suitable bearings which are provided in the frame F. The pivot pins 16 are rigidly fixed to arms 12, which are respectively pivotally connected to the bars 10. A link 14 is pivotally connected to each rod 12 and also to a pivot pin 15, which is connected to a movable filling nozzle 7. Said filling nozzle 7 turns around the axis of shaft 8, so that the elements 17 and 7 turn in unison. The yoke 17a is provided with pivot pins 19, which correspond to the pivot pins 16. The arms 17' correspond to the arms 12.

The barrel 18 is enclosed, save that one of its ends walls has an opening 18b which can serve either as a filling opening or an outlet opening. The opening 18c of the barrel 18a corresponds to said opening 18b.

As shown in Fig. 15, said end wall of the barrel 18 is provided with a slide 120, which is guided between guide members 122, which are fixed to said end wall by the screws 124. A cross bar 127 is connected to the guides 122. One end of a tension spring 125 is connected at 126 to the cross bar 127, and the other end of said tension spring 125 is connected at 128 to the slide 120. One end of the slide 120 has a stop flange 123, which abuts the adjacent ends of the guides 122, when the slide 120 is in the closing position illustrated in Fig. 15. The other end of the slide 120 is provided with an operating flange 121.

Referring to Fig. 14, if a charge of material is to be filled into the barrel 18a, the nozzle 7 is turned so that its tip strikes the respective flange 121, thus moving the slide 120 until the tip of the nozzle 7 registers with the opening 18c, which now serves as a filling opening. Fig. 14 shows the flange 121 of the slide of the barrel 18, abutting the edge of the lower hopper 27. The slide 120 of the barrel 18 is thus held so that the opening 129 now registers with the opening 18b, so that material is discharged from the barrel 18 to the lower hopper 27.

When the barrels are in the position shown in Fig. 1, material is being poured into the barrel 18, and material is being discharged from the barrel 18a.

Each tumbling barrel 18 and 18a is of conventional construction, and it is provided with a turnable shaft to which agitating members are fixed, inwardly of the respective barrel. These details are not shown as they are well known per se. The shaft of the barrel 18 is provided with a clutch member 21, and the shaft of the barrel 18a is provided with a corresponding clutch member 21a. When the tumbling barrels are in the intermediate position illustrated in Fig. 12, said clutch members 21 and 21a are respectively engaged with cooperating clutch members 22 and 22a. These clutch members 22 and 22a are slidable on respective supporting shafts 26 and 26a.

The usual lever 23 is pivotally connected to the frame of the machine at 24, and said lever 23 is provided with an actuating rod 25, which is pivotally connected to said lever 23. The elements 23a, 24a and 25a respectively correspond to the elements 23, 24 and 25. When the barrels have been moved into the position shown in Fig. 12, in which their shafts are horizontal, the clutch members 22 and 22a are moved to mesh respectively with the clutch members 21 and 21a, and the rods or shafts 26 and 26a are then rotated by suitable mechanism, in order to agitate the contents of the tumbling barrels.

When a tumbling barrel is in the discharge position in which the tumbling barrel 18 is shown in Fig. 14, part or all of the contents P of said tumbling barrel may be discharged into the lower discharge hopper 27. This discharge hopper 27 has a throat 35 which is of cylindrical or other suitable shape. The throat 35 communicates with the tapered upper end of a housing 36.

An air-lock is provided in order to keep as much air as possible out of the housing 36, when material is delivered to said housing 36. This air-lock comprises a pair of valves 28 and 29 which fit snugly against the inner wall of the throat 35, when said valves 28 and 29 are in respective horizontal positions. As shown in Fig. 12, the valve 28 is fixed to a turnable shaft 30, and the valve 29 is similarly fixed to turnable shaft 31. Arms 32 and 33, which are external to the throat 35, are rigidly fixed to the respective shafts 30 and 31. These arms 32 and 33 are pivotally connected to an operating rod 34.

When one of the valves 28 and 29 is in the open position, the other valve is in the closed position. Material can thus be discharged into the throat 35, while the valve 29 is in the closed position and the valve 28 is in the open position, until the material P fills the throat 35. The rod 34 can then be operated either manually or by suitable mechanism, to open the valve 29 and also to close the valve 28 substantially simultaneously. The material is thus intermittently supplied to the casing 36 with very little admission of air because the material P is finely divided and it packs the throat 35, without a substantial quantity of air.

The housing 36 is provided with a pipe 136, which is controlled by the hand-operated valve 137. The pipe 136 may be connected either intermittently or continuously to a suitable source of suction, in order to remove as much air as possible from the housing 36 and the other housings in which the operations are performed upon the powdered material P. The connection between the casing 36 and the pipe 136 may be provided with any suitable screen, in order to prevent the removal of the finely powdered material by the suction which is exerted through the pipe 136.

Below its top, the housing 36 is provided with a hopper 37, whose nozzle 38 discharges into a fixed hopper or pan 39. This pan 39 is provided with a turnable bottom wall 40 which is connected by a pivot pin 41 to a bracket which is fixed to said pan 39. The member 40 is provided with an extension 42, on which a weight 43 is adjustably mounted. The bottom wall 40 is thus moved to the discharge position which is illustrated in full lines in Fig. 16, when a predetermined weight of material has been delivered to the pan 39. A slotted arm 44 is rigidly connected to the pivot pin 41, so that the elements 44 and 40 turn in unison. The pin 45 of a slidable valve 46 is located in the slot of the arm 44. This valve 46 has an opening 47, which is aligned with the nozzle or throat 38, when material is being delivered to the pan or hopper 39. When the required weight of material has been delivered to the pan 39, the valve 46 is moved to the position shown in Fig. 14, in which it prevents the entrance of more material into the pan 39.

Any suitable means may be provided for feeding regulated masses of the powdered material to the respective molds.

Each weighed charge of material is fed through the throat 49 of the bottom hopper 48 into the respective aligned mold M.

Each mold M has a bottom wall 50, whose upper face has a recess which corresponds to the shape of the member B.

The molds M are fed through the apparatus with adjacent walls in abutting series. The molds are thus fed through a chute or tunnel which has legs 51, 52, 53 and 54. Each of said legs 51—54 has a horizontal longitudinal axis, and the axes of the adjacent legs are perpendicular to each other.

In Fig. 5, the mold whose position is indicated by the reference numeral 55, is vertically aligned with the throat 49 of the hopper 48, in order to receive a charge of material.

The molds are pushed through the legs 54 and 52 by the heads of respective plungers 57 and 57a. Said molds M are pushed through the legs 51 and 53, by the heads of respective plungers 56 and 56a. These plungers operate through respective stuffing boxes 58 so as to exclude air from said chute or tunnel.

The plungers 56 and 56a are operated in unison and in opposite directions. The plungers 57 and 57a are also operated in unison, and in opposite directions.

These plungers are operated intermittently, either by hand or by suitable mechanism.

When the plungers 56 and 56a have been operated inwardly so that their heads have the positions illustrated in Fig. 5, the plungers 57 and 57a are held stationary and their heads are in the positions illustrated in Fig. 5. Therefore, after the plungers 56 and 56a have been moved outwardly relative to the legs 51 and 53, said plungers 56 and 56a are maintained stationary and the plungers 57 and 57a are moved inwardly in their respective legs 54 and 52.

The molds are guided by means of angular tracks 59, which are provided in the legs 51—54. In this particular embodiment, the length of each mold exceeds the width thereof. The molds are fed in the direction of their longitudinal axes in the legs 54 and 52, and they are fed in a direction perpendicular to their longitudinal axes, in the legs 51 and 53. The tracks 59 are rigidly connected to suitable frame members.

After each mold has received its predetermined charge, the first operation is the cold-pressing of the powdered material. In the cold-pressing zone, each mold is held against lateral movement by supplemental means. As shown in Fig. 4, the bottom wall or insert 50 of each mold M is provided with a V-shaped recess, and the bed along which the mold slides is provided with a V-shaped extension 60, in the cold-pressing zone. This extension 60 fits snugly in the slot of the member 50. Fig. 4 shows a plunger 61, which has a head 62. This plunger 61 is operated by conventional hydraulic mechanism 63, which is located in a housing 64 which is provided with a window 65.

The hydraulic mechanism is operated either by hand or automatically, so as to depress and raise the plunger 61, when the respective mold M is located below the plunger 61. The housing 64 is enclosed so that no air can enter the mold.

The hydraulic mechanism 63 is provided with an inlet pipe 130 and an outlet pipe 132. The inlet pipe 130 is provided with a valve 131. The hydraulic press 63 can thus be operated while excluding air from the housing 64.

After the cold-pressing, the mold is fed through the heating tunnel 66, which is provided with an induction coil 67, which is connected to any suitable source of alternating current. Fig. 5 shows the terminals 68 and 69 of the induction coil 67, and it shows that the induction coil 67 may be provided with an adjustable impedance 70, which may be a resistance or an inductance or the like, in order to control the current which is supplied to the induction coil. This coil 67 has insulating supports 67a, as shown in Fig. 2. Each mold M is made of metal, so that during its passage through the heating tunnel 66, each mold and the cold-pressed material therein, are heated by induction. This heating tunnel 66 has a lining 66a of insulating material, which may be omitted.

Each mold is then moved into a hot-press housing 71, which is also enclosed. The housing 71 is provided with conventional hydraulic mechanism 72, which operates the plunger 73, which has the head 74. The head 74 is identical in shape with the upper face of the bushing B which is shown in Fig. 4.

The hydraulic mechanism 72 is provided with an inlet pipe 133 and an outlet pipe 135. The inlet pipe 133 is provided with a valve 134. The mold may be held against lateral shifting, during the hot-pressing by member 60.

The cold-pressing is thus performed adjacent one end of the leg 54 and the hot-pressing is performed adjacent the other end of the leg 54.

The molds and the material therein are allowed to cool while passing through the leg 51.

The leg 51 is preferably very short in comparison with the length of the leg 54, so that the cooling of the molds and of their hot-pressed charges is insignificant in said leg 51. The cooling is controlled in the leg 52, by means of an induction coil 75, whose ends are connected to the terminals 76 and 77. An adjustable impedance 78 is provided, in order to regulate the amount of current which is supplied to the induction coil 75. The induction coil 75 supplies enough heat in the leg 52, so as to regulate the cooling of the molds and their hot-pressed charges, in order to anneal the hot-pressed masses. The cool molds and their cooled charges are then pushed into the leg 53, and they are then discharged at the discharge station 79. The heating means in the annealing chamber are optional, as said heating means may be omitted, and the annealing may be regulated by regulating the radiation of heat in the annealing leg 52, without adding heat.

Referring to Figs. 5 and 10, the leg 53 is provided with a plate 80 at the discharge station 79.

An inverting frame 81 is fixed to the turnable shaft 82, to which the gear 83 is fixed. Said gear 83 meshes with a larger gear 84. The diameter of gear 84 may be twice the diameter of gear 83. Gear 84 is fixed to a shaft 84c, to which rod 84a is fixed. Said rod 84a is pivotally connected to operating link 84b.

When frame 81 is in the position shown in Fig. 9, it receives the mold M which is to be inverted. Shaft 84c is then turned 90°, thus turning frame 81 through an arc of 180°, to the position shown in Fig. 10.

As shown in Fig. 10, an ejector slide 85 is vertically slidable between vertical guides 86. A lever 87 is pivotally connected at 88 to the slide 85 and said lever 87 is pivotally connected at 89 to frame F. This lever 87 has the usual cam roll 90 which cooperates with the turnable cam 91, so as to oscillate the lever 87 between the full-line position and the broken-line position which is shown in Fig. 10. The line 92 indicates the level of the top wall of the slide 85, when the slide 85 is in the ejecting position which is shown in Fig. 10. At its lower end the slide 85 is provided with projecting ejecting pins 93, which can move through bores 94 which are provided in the bottom wall or insert 50 of the mold M. When the slide 85 is lowered, these ejecting pins eject the respective member B to the vertical discharge chute 95. The members B may be thus vertically stacked in the vertical discharge chute 95. However, it is preferred that the members B should not be stacked in the discharge chute 95, so that each respective member B will be removed from the outlet of discharge chute 95 before the next member B is admitted to the upper end of said discharge chute B. This result is secured by proper timing of the ejector slide 85, relative to the speed of movement of the conveyor 99. This discharge chute B may be of rectangular cross-section and it may be inclined at any angle to the vertical, so that the members B will be guided by said discharge chute 95, as said members B move downwardly in an inclined direction. The lower end of the discharge chute 95 opens into a tank 96 which contains any suitable liquid 97, such as oil or the like. The discharge mechanism is located in a housing 98, which is closed save at its bottom, and since the apparatus is maintained under a vacuum, the lubricating oil or other annealing or tempering liquid 97 will rise substantially to the top of the chute 95.

This tank 96 may be of any desired length, so that each member B contacts with the oil in said tank 96 during any desired period of time, before the conveyor 99 removes the respective article B out of contact with said oil. The oil may be circulated through discharge chute 95, in order to cool the same. For this purpose, a pump 95a is connected by a pipe 95b to the upper end of chute 95, and said pump has a pipe 95c whose end is below the level of the liquid 97 in tank 96. The liquid is thus pumped continuously through chute 95, either upwardly or downwardly. The pipes 95c and 95b may be cooled in any suitable manner.

The completed articles are removed from the tank 96 by means of the usual endless conveyor 99, which is provided with the projecting pins 100. This conveyor may be of the conventional link belt type. The bushings B are thus raised to the platform 101, from which they are removed by any suitable mechanism. One of the sprockets or pulleys of the belt conveyor 99 is provided with a drive pulley 102, which is driven by belt 103.

The cam 91 is a release cam, which permits the slide 85 to drop under the force of gravity at the proper time.

The shaft 91a of the cam 91 is provided with a gear 104 which meshes with a gear 105 of a drive shaft 106. This cam control conveniently illustrates a conventional mechanical device for actuating any driven member of the apparatus.

Referring to Fig. 6, each mold M consists of longitudinal walls 107 and transverse walls 108 whose ends fit in vertical grooves of the longitudinal walls 107. The longitudinal walls 107 are forced towards each other by a series of bolts 109, thus clamping the transverse wall 108 in position. The insert 50 is clamped to the longitudinal walls 107, by means of bolts 110.

The operation of the improved apparatus is as follows:

The valve 28 is closed, so as to seal the throat 35. Suction is then applied through the pipe 136 whose valve 137 is opened for this purpose. The suction is continued until the working vacuum in the apparatus is as high as possible. The liquid 97 in the tank 96 is drawn upwardly by means of this suction, until the height of the column of liquid in the chute 95 is substantially at the level of the header 95a. The bottom of the chute 95 is below the level of the liquid 97, so that a liquid seal is formed at the outlet of the outlet chute 95. This liquid seal is maintained continuously during the operation of the apparatus. Prior to creating this vacuum, the upper part of the casing 36 can be filled through any suitable inlet opening which is then closed airtight, and the element 40 is held against movement by any suitable detent which is operated externally of the casing 36. The element 40 is now released, and the conveyor 1 is actuated in order to supply material to the barrel 18. One of the molds M is in the filling position indicated by the reference numeral 55 in Fig. 4. The leg 54 is filled with molds, and there is a space in the aligned portion of the leg 51, to receive a mold. Save for this space, the leg 51 is filled with molds. The leg 59 is filled with molds. The leg 53 is filled with molds, save that there is a space at the part thereof which is aligned with the leg 59, in order to receive a mold. The head of the plunger 57 abuts the respective wall of the mold M, which is in the position 55. The plungers 56 and 58 are in their respective retracted positions in which they clear the respective adjacent spaces in the legs 51 and 53. As soon as the mold which is in the position 55 has received its charge, the plunger 57 is moved inwardly in order to transfer a mold from the leg 54, to the aligned part of the leg 51. The plunger 57a is simultaneously pushed inwardly or to the left, thus transferring the respective mold to the leg 52, and transferring a mold from the leg 52 to the aligned part of the leg 53. The plungers 56 and 56a are then pushed inwardly, thus transferring the next mold to the position 55 and shifting the molds in the leg 51, so as to provide another space in the leg 51, which is aligned with the leg 54. Of course, the plunger 57a is retracted while the plunger 56a is pushed inwardly and the plunger 57 is retracted while the plunger 56 is pushed inwardly.

There is enough charge in the casing 36, above the pan 39, to charge a substantial number of molds. While the molds are thus being actuated, the barrel 18 is being filled, and the barrel 18a is emptying its charge into the casing 36, while the valves 28 and 29 are rocked with sufficient rapidity to prevent any overflow of material from the hopper 27. Prior to starting the apparatus, the barrel 18a is filled with a suitable charge of the mixed material. The rate of discharge of the barrel 18a is regulated in accordance with the speed at which the molds M are fed through the apparatus, so as to maintain some material in the hopper 27, but without any overflow of material from said hopper 27.

After the barrel 18a has been emptied, both barrels are moved to the respective positions shown in Fig. 12, thus automatically shutting off the feed of material through the nozzle 6b. The contents of the filled barrel 18 are then rapidly agitated so as to produce a suitable intermixing of the metallic or other ingredients which are being used for manufacturing the articles B. While the contents of the barrel 18 are thus being agitated, the feeding of material to the hopper 6 may be discontinued. If desired, the feed of material to the hopper 6 may be continuous, the rate of said feed being regulated so as to maintain a certain amount of material in said hopper 6 at all times, but without any overflow.

The barrels are then turned to the position indicated in Fig. 14, in which the barrel 18 discharges its load, while the barrel 18a receives a fresh load.

Each mold thus receives its weighed charge of material, and it is fed intermittently through the induction furnace which is located in the leg 54, and it is then cooled under regulated conditions in the leg 52. At the discharge station, the mold is turned and the completed article is ejected therefrom into the liquid seal of the discharge chute 95. The completed article may be at any desired temperature when it is discharged into the liquid column in the chute 95 so that the cooling is completed by means of said column of liquid.

The rails 59 terminate at the entrance end of the inverter frame 81. Therefore, when the frame 81 rests on the plate 80, as shown in Fig. 10, the respective mold is pushed into said frame 81 and off the tracks 59. The tracks 59 are provided with sections between the outlet end of the frame 81 and the charging station 55.

The purpose of the vacuum in the apparatus is to eliminate as much oxygen as possible, and thus to prevent the oxidation of the metal particles. The nitrogen of the atmosphere is also deleterious to iron or steel. By means of the vacuum, we remove the greater part of the oxygen and nitrogen, including the oxygen and the nitrogen in the pores of the metal particles. When we refer to the use of a vacuum, we refer to the effective elimination of oxygen and nitrogen. As later stated herein, said vacuum may be maintained by a liquid seal of lubricating oil, which provides a vapor or vapors, whereby a carburizing atmosphere is secured. As later stated, such lubricating oil may be heated to any temperature, so that the invention is not limited to any particular pressure of the carburizing vapor or vapors, when we specify a vacuum.

For example, the mouth of the outlet chute 95 can be submerged any desired distance below the top of the liquid 97. After the valve 28 has been closed, the air in the apparatus can be exhausted so as to remove as much air as possible. The sealing liquid will then rise in the chute 95, to a height which is determined by the vacuum in the apparatus. The pipe 136 can then be connected to a source of inert gas or reducing gas which may be below atmospheric pressure or at atmospheric pressure or above atmospheric pressure. If the pressure of said source is below atmospheric pressure, the column of liquid in the outlet chute 95 will rise to a suitable height until the pressure of said source, plus the result of the column of liquid, will balance the external atmospheric pressure. In such case, a supplemental suction pipe can be connected to the throat 35, between the valves 28 and 29. When the valve 29 is closed and the valve 28 is opened, the finely powdered material will permit the entrance of air into said throat 35, only slowly. The air in the throat 35, which is intermixed with the fine particles of material, can then be rapidly substantially removed by exercising suitable high suction and said suction can be stopped when the valve 28 is closed and the valve 29 is opened, so that little or no air will enter the apparatus. The valves 28 and 29 can be operated separately, instead of being operated in unison.

If the apparatus is filled with carbon dioxide or nitrogen or other inert gas under a pressure which exceeds the atmospheric pressure, or if the apparatus is thus filled with a suitable reducing gas such as hydrogen, the level of the liquid column in the chute 95 will be below the level of the liquid in the tank 96, until the excess pressure is balanced, thus preventing any escape of the compressed gas through the liquid seal. In such case, the vertical distance between the bottom of the chute 95 and the top of the liquid in the tank 96 may be thirty feet and even more, depending on the density of the liquid and the excess pressure in the apparatus. There will be some escape of the compressed gas when the valves 28 and 29 are actuated to admit more material, but this escape can be minimized.

While the hot-pressing may be at any desired temperature, it is preferably below the melting point of any of the ingredients of the alloy. If it is desired to make a cobalt iron alloy, for example, the temperature may be below the melting point of the major ingredient (which has the highest melting point) and above the melting point of the minor ingredient (which has the lowest melting point).

Since the liquid in the chute 95 is preferably a lubricating oil, the porous member B is dropped directly into said liquid before any air can enter the interstices of the porous member B, so that the interstices are fully charged with the liquid before said interstices are filled with any substantial quantity of air.

Without limiting the invention to any specific figure or example, it is preferred to conduct the operations when the density of the atmospheric gases corresponds to a pressure of about three inches of mercury. Whenever a vacuum is referred to in the claims, this includes any pressure which is less than external atmospheric pressure.

The invention is not necessarily limited to making a porous metal article.

It is clear that many of the parts can be omitted or changed without departing from the spirit of the invention. The material which is fed into the hopper 27 may have been previously mixed and tumbled, thus eliminating the tumbling barrels 18 and 18a and their associated parts. The mechanism for supplying weighed charges to the respective molds may also be of any conventional type. Any means may be utilized for moving and for heating the molds.

Without limiting the invention to this particular feature, one of the most important features of our invention is that the various operations are performed upon the raw material in a vacuum and that the completed articles are discharged without breaking said vacuum, and preferably through a liquid seal. The liquid seal may consist of lubricating or other material which is solid or semi-solid at ordinary temperatures of about 20° C., and said liquid seal may be heated to any desired temperature. Likewise, if the liquid seal is liquid at ordinary room temperature, the material of said liquid seal may be heated to any desired temperature.

Whenever we refer in any claim to an airlock, we include any means whereby material is introduced into the apparatus, while substantially excluding the air.

The four legs 54, 51, 52 and 53 may be collectively referred to as a tunnel. Said tunnel may have more than four legs. The molds abut each other in said legs, save at the alternate junctions of the legs. The tunnel is enclosed, save at its outlet and inlet, and said inlet has an air-lock.

The presses and the heaters are respectively means which are adapted to operate on the material which is used for making the article. The invention is not limited to the use of both heat and pressure, and the material may be subjected to any type of treatment.

A new and superior product, which is part of the invention, is made according to the preferred method. Since the particles are subjected to a high vacuum prior to and during the cold-pressing and the hot-pressing, said particles are freed from air much more effectively than if the completed porous article were subjected to a vacuum. This article, having its interstices substantially free of air, is dropped directly into an air-free bath of lubricating oil or other lubricating material or material of any type. The article is maintained in contact with the liquid, in the absence of air, until its interstices are fully charged with the liquid, and the free surfaces of the connected particles are coated with the liquid. Additional liquid is added to tank 96, as required, and said liquid is free of dissolved air or air-bubbles. If the liquid in the outlet tube 95 is a lubricating oil of the usual type, some of the lighter ingredients of this lubricating oil will vaporize at the top of said member 95, due to the low pressure of the oxygen and nitrogen and other atmospheric ingredients within the apparatus. This provides a carburizing atmosphere. As previously stated, the completed article may be at any desired temperature when it is discharged into the liquid column in the chute 95, so that the cooling is completed by means of said column of liquid. The heat of the oil at the top of the member 95 can therefore be controlled, so as to regulate the vapor pressure of carburizing atmosphere.

The major ingredient of the product is preferably iron, which may comprise 90%–100% of the article.

The apparatus may be designated as being substantially enclosed, in that it is so constructed and operated as to substantially prevent the free entry of air from the atmosphere.

The metallic or other ingredients of the body may be oxidizable or non-oxidizable.

The cold-pressing operation is in many cases desirable, but it is not always necessary, in order to produce satisfactory articles, so that the cold-pressing operation is optional.

We claim:

1. A method of making a member from connected metal particles, which consists in connecting said particles to each other under heat and pressure in a chamber which is maintained under vacuum with respect to atmospheric gases, so that said metal particles are substantially unaffected by said atmospheric gases during said connection, and expelling the completed articles from said chamber through a liquid seal which maintains said vacuum.

2. A method of making a porous metal article whose interstices are filled with a liquid, said article being made of connected particles, which consists in connecting said particles under heat and pressure in a chamber which is maintained under vacuum with respect to atmospheric gases, so that said particles are substantially unaffected by said atmospheric gases during said connection, expelling the article from said chamber through a seal of said liquid which maintains said vacuum, maintaining said article in contact with said liquid until the interstices of said article are filled with said liquid.

3. A method of forming a porous metal body from connected particles of metal, which consists in connecting said particles by heat and pressure to each other in a chamber which is maintained under vacuum with respect to atmospheric gases, so that said particles are substantially unaffected by said atmospheric gases during said connection, and expelling the completed article from said chamber through a liquid seal which maintains said vacuum, while taking up the liquid of said seal in the interstices of said article.

4. A method of making a porous metal article which consists in connecting metal particles to each other to form said body in a chamber which is maintained under vacuum, with respect to atmospheric gases, so that said particles are substantially unaffected by said atmospheric gases during said connection, while leaving interstices between said connected metal particles, discharging the formed body out of said chamber through a liquid seal which maintains said vacuum while admitting the liquid of said seal into the evacuated interstices of said article.

5. A method of making a member from connected particles, which consists in connecting said particles to each other under heat and pressure in a carburizing atmosphere which contains atmospheric gases at less than normal atmospheric pressure and expelling the completed articles from said carburizing atmosphere through a liquid seal which maintains said carburizing atmosphere at less than normal atmospheric pressure.

6. A method of making a member from connected particles, which consists in connecting said particles to each other under heat and pressure in a carburizing atmosphere which contains atmospheric gases at less than normal atmospheric pressure and expelling the completed articles from said carburizing atmosphere through a liquid seal which maintains said atmosphere at less than normal atmospheric pressure, the liquid of said seal being evaporated therefrom to provide said carburizing atmosphere.

7. A method of making a porous metal article and impregnating said article with a liquid, which consists in feeding powdered metal material into the inlet end of a chamber which has an outlet, producing and maintaining a vacuum with respect to atmospheric gases in said chamber and maintaining said vacuum at the outlet end of said chamber by a seal of said liquid, feeding said metal powdered material in said chamber in a direction towards said outlet end to a cold-pressing station, cold-pressing the powdered metal material in said chamber to form a coherent mass, then feeding said cold-pressed mass in said chamber in a direction towards said outlet end to a hot-pressing station while heating said cold-pressed material, hot-pressing the heated cold-pressed material at said hot-pressing station to form a hot-pressed mass, then feeding the hot-pressed mass in said chamber in a direction towards said outlet end while lowering the temperature of the hot-pressed material, then expelling the hot-pressed mass through said liquid seal while taking up the liquid of said seal into the interstices of said hot-pressed mass, said vacuum with respect to atmospheric gases being sufficiently high to substantially protect said powdered material and said cold-pressed mass and said hot-pressed mass from the action of said atmospheric gases.

8. A method of making a porous metal article whose interstices are filled with a liquid, said article being made of connected metal particles, which consists in introducing the unconnected metal particles into a chamber which has an inlet and which has an outlet, maintaining a vacuum in said chamber with respect to atmospheric gases while maintaining said vacuum at the outlet end of said chamber by means of a seal of said liquid, moving the metal particles in said chamber from said inlet to a pressing station, pressing the particles together in said chamber to form a coherent mass, expelling said coherent mass from said chamber through said liquid seal while taking up the liquid of said seal in the interstices of said coherent mass, said vacuum with respect to atmospheric gases being sufficiently high to remove substantially all of the atmospheric gases from the unconnected metal particles, prior to forming said coherent mass.

9. A method of making metal articles from particles of metal which consists in feeding the unconnected metal particles into the inlet of a chamber which is maintained under a vacuum with respect to atmospheric gases, said vacuum being sufficiently high to substantially free said particles from atmospheric air, feeding said unconnected particles in said evacuated chamber to a cold-pressing station, cold-pressing said unconnected metal particles at said cold-pressing station to form a coherent cold-pressed mass, feeding said cold-pressed mass to a hot-pressing station at which said hot-pressed mass is subjected to hot-pressing action to form a hot-pressed mass, removing the hot-pressed mass through an outlet of said chamber, substantially maintaining said vacuum in said chamber during said cold-pressing and hot-pressing operations and also while the unconnected metal particles are fed into said chamber and while the hot-pressed masses are removed from said chamber, performing said hot-pressing operation while metal material is located in said chamber anterior the hot-pressing station.

10. A method of making metal articles from particles of metal which consists in feeding the unconnected metal particles into the inlet of a chamber which is maintained under a vacuum with respect to atmospheric gases, said vacuum being sufficiently high to substantially free said particles from atmospheric air, feeding said unconnected particles in said evacuated chamber to a cold-pressing station, cold-pressing said unconnetced metal particles at said cold-pressing station to form a coherent cold-pressed mass, feeding said pressed mass to a hot-pressing station at which said cold-pressed mass is subjected to hot-pressing action to form a hot-pressed mass, removing the hot-pressed mass through an outlet of said chamber, substantially maintaining said vacuum in said chamber during said cold-pressing and hot-pressing operations and also while the unconnected metal particles are fed into said chamber and while the hot-pressed masses are removed from said chamber, performing said hot-pressing operation while metal material is located in said chamber anterior the hot-pressing station, said vacuum being maintained at said outlet by a liquid seal through which the hot-pressed mass is discharged.

11. A method of making coherent metal masses from unconnected metal particles, which consists in moving a series of molds in the same direction and in a closed path through a chamber which has an inlet opening and an outlet opening, said closed path having a cold-pressing station and a hot-pressing station, maintaining said chamber under a vacuum with respect to atmospheric gases which is sufficiently high to substantially remove said atmospheric gases from said unconnected particles, filling each mold with a charge of said unconnected metal particles through said inlet opening without substantially breaking said vacuum, then moving each filled mold in said closed path to said cold-pressing station, cold-pressing the filling of each mold at said cold-pressing station to form a coherent mass in each mold, then moving each mold to the hot-pressing station, hot-pressing each said mass in said mold at said hot-pressing station, then moving each mold to said outlet end and discharging each hot-pressed mass from said mold and said chamber through said outlet end without substantially breaking said vacuum.

12. A method according to claim 11 in which the vacuum is maintained at said outlet end by a liquid seal through which the hot-pressed masses are discharged.

13. A method according to claim 11, in which a carburizing atmosphere is maintained in said chamber.

ALBERT W. MORRIS.
WILLIAM J. SINNOTT.